US009659173B2

(12) United States Patent
Klein et al.

(10) Patent No.: US 9,659,173 B2
(45) Date of Patent: May 23, 2017

(54) METHOD FOR DETECTING A MALWARE

(75) Inventors: Amit Klein, Herzliya (IL); Eldan Ben-Haim, Kiryat Ono (IL); Gal Frishman, Netanya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 582 days.

(21) Appl. No.: 13/362,963

(22) Filed: Jan. 31, 2012

(65) Prior Publication Data
US 2013/0198842 A1 Aug. 1, 2013

(51) Int. Cl.
*G06F 21/56* (2013.01)
*G06F 21/55* (2013.01)

(52) U.S. Cl.
CPC .......... *G06F 21/562* (2013.01); *G06F 21/554* (2013.01); *G06F 21/563* (2013.01); *G06F 21/566* (2013.01); *G06F 21/56* (2013.01); *G06F 21/561* (2013.01)

(58) Field of Classification Search
CPC ............ H04L 63/1433; H04L 63/1416; H04L 63/145; H04W 12/00; G06F 21/56; G06F 21/562; G06F 21/564; G06F 21/563; G06F 21/552; G06F 21/561; G06F 21/566; G06F 21/554
USPC .................................................... 726/22–25
See application file for complete search history.

(56) References Cited

U.S. PATENT DOCUMENTS

| | | | |
|---|---|---|---|
| 7,340,777 B1 * | 3/2008 | Szor | 726/26 |
| 7,607,173 B1 * | 10/2009 | Szor et al. | 726/25 |
| 8,230,499 B1 * | 7/2012 | Pereira | 726/22 |
| 2005/0108562 A1 * | 5/2005 | Khazan et al. | 713/200 |
| 2006/0075494 A1 * | 4/2006 | Bertman et al. | 726/22 |
| 2008/0034430 A1 * | 2/2008 | Burtscher | G06F 21/562 726/23 |
| 2008/0052679 A1 * | 2/2008 | Burtscher | 717/124 |
| 2010/0107257 A1 | 4/2010 | Ollmann | |
| 2010/0192222 A1 * | 7/2010 | Stokes et al. | 726/22 |
| 2010/0229239 A1 * | 9/2010 | Rozenberg et al. | 726/24 |

OTHER PUBLICATIONS

Giffin et al., "Attribution of Malicious Behavior", Springer, 2010, pp. 1-47, http://down load.springer.com/static/pdf/274/chp%253A10.1007%252F978-3-642-17714-9_4.pdf?auth66=1423855484_5660f4b42a1f26b7c96557345d967d40&ext=.pdf.*

* cited by examiner

*Primary Examiner* — Robert Leung
*Assistant Examiner* — Carlos M De Jesus Lassala
(74) *Attorney, Agent, or Firm* — Daniel J. Swirsky; AlphaPatent Associates Ltd.

(57) ABSTRACT

System and method for determining, by a security application, whether an examined software code is a malware, according to which the system detects whenever the examined process code performs system calls and further detects a call site. Pieces of code in the surrounding area of the site and/or in branches related to the site are analyzed and the properties of the analyzed pieces of code are compared with a predefined software code patterns, for determining whether the examined process code corresponds to one of the predefined software code patterns. Then the examined process code is classified according to the comparison results.

15 Claims, 2 Drawing Sheets

METHOD FOR DETECTING A MALWARE

FIELD OF THE INVENTION

The present invention relates to the field of Internet security. More particularly, the invention relates to a method for providing more secure browsing and preventing the theft of online sensitive information.

BACKGROUND OF THE INVENTION

As the web browser is becoming the most frequently used application on a personal computer, and as more user confidential data is being entered through the web browser, such as banking and shopping transactions, malicious attacks are being increasingly focused on the web browser. There is an increasing number of malicious exploits that can install malicious code, such that a malicious browser extension persists on a target computer system. For a malicious browser extension to persist on a computer system, typically a malicious file is created so that the malicious extension persists on the disk, and a registry entry associated with the malicious browser extension is created to notify the web browser that a browser extension has been registered with the operating system.

Thus, for example, if a user enters user confidential data into a form field of a web page, and a malicious browser extension is present on the web browser, when the malicious browser extension receives an event, the malicious browser extension potentially has the ability to access and modify the content of the event. For example, the malicious browser can copy or modify the user confidential data, such as a bank account routing number in the post data parameter of the event, resulting in compromise of the user confidential data.

To protect consumers and service providers, many software and hardware solutions have been proposed or developed. These methods in general enhance online authentications, but they implicitly assume that the web browser, the most prevalent tool for online activities, is secure. Also, these solutions are not directed to provide protection against malware installation process.

Another problem of existing solutions is the fact that in order to classify an *.exe file as malicious or benign, protective tools have to scan its content. Sometimes this process may take more time that requires to a malicious file to install itself. This limitation may result in an unavoidable damage to the infected system.

To address this problem and to protect users from being exploited while browsing the web, browser infection detection tools are required.

It is therefore an object of the present invention to provide a system which is capable of detecting behavior associated with a malware.

It is another object of the present invention to provide a system capable of preventing the complete installation of a malware.

Other objects and advantages of the invention will become apparent as the description proceeds.

SUMMARY OF THE INVENTION

The present invention is directed to a system and method for determining, by a security application, whether an examined software code is a malware, according to which the system detects whenever the examined process code performs invocations (such as is system calls) and further detects a call site (the site within the examined process code, from which the invocations has been launched). One or more pieces of code in the surrounding area of the site and/or in branches related to the site are analyzed and at least a part of the properties of the analyzed pieces of code are compared with a predefined software code patterns, for determining whether the examined process code corresponds to one of the predefined software code patterns. Then the examined process code is classified according to the comparison results.

The examined process code may be classified as malicious or benign and may be loaded from an executable or from a DLL.

The examined process code may be a portion of the functions call tree, a specific subroutine or a combination of specific code lines that are spaced from each other by several code instructions.

The security application or at least a portion thereof, may reside on the client device.

Detection of attempts to install a malware may be made offline or in real-time. Upon detection the malware is prevented from completing its installation.

In one aspect, the security application that may be called from an application or from the operating system, compares each analyzed piece of software code against a "black list" of known malware patterns and

DETAILED DESCRIPTION OF PREFERRED EMBODIMENTS

Figure 1:
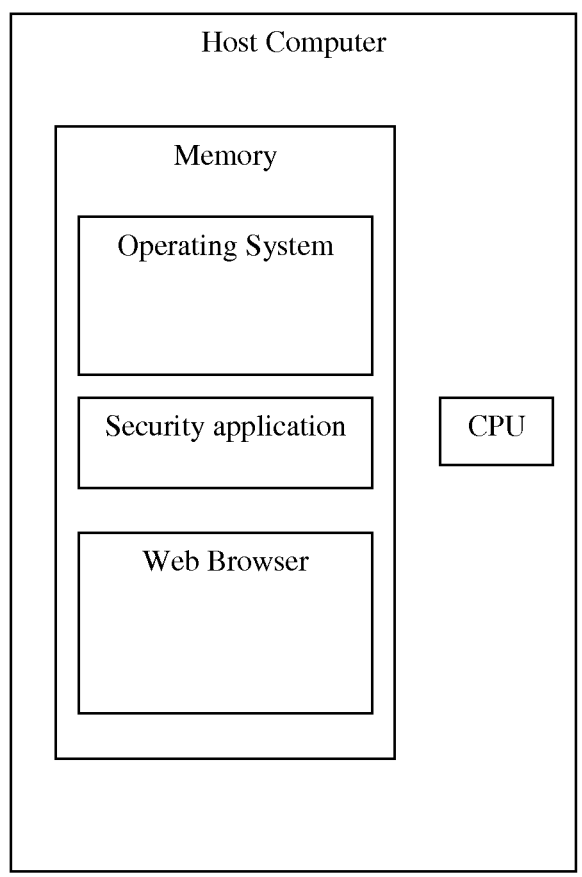
FIG. 1 is a flow chart generally illustrating the method of the invention.

The figures and the following description relate to embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made to several embodiments of the present invention(s), examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Unless otherwise indicated, the functions described herein may be performed by executable code and instructions stored in computer readable medium and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a Personal Computer (PC) system, Mac, other computer or electronic systems can be used as well, such as, without limitation, a network-enabled personal digital assistant (PDA), a smart phone, a tablet, and so on.

The present invention relates to a method for real-time detection of attempts to install a malware in a computer system (e.g., in order to infect web browsers with malware). According to an embodiment of the invention, and as will be exemplified hereinafter, a method is provided for preventing from a malware (or other suspicious software code) to complete its installation.

The term "malware" refers herein to a malicious code that is defined as any computer program, module, set of modules, or code that enters a computer system environment without an authorized user's knowledge and/or without an authorized user's consent. A malicious browser extension, such as a malicious BHO, that can access user private data in a browser event is one example of malicious code. Further herein, malicious activity is any activity resulting from the execution of a malicious code.

In the present embodiment, the web browser is any one of a number of conventional web browser applications, such as Microsoft Internet Explorer, or Firefox.

Embodiments in accordance with the invention detect and may prevent attempts to install malwares. In one embodiment, a security application is installed on a host computer system that is registered to detect invocations from the OS of the host computer. Such invocations may be function calls that interact with the Windows Registry of the host computer (in case where the OS is Microsoft Windows) or with file system operations.

When an invocation is detected, a determination is made whether the properties of program code from which that invocation was launched represent a malware. In one embodiment, if the invocation is not determined to be a suspicious event, the event is enabled for further processing (e.g., for completing the installation process). Alternatively, if the invocation is determined to be a malware, the installation process of that software code is terminated.

Referring now to FIG. 1, a diagram of a computer system including a security application for detecting attempts to install and execute malwares on a host computer system is shown in accordance with an embodiment of the present invention. The host computer system, sometimes called a user device, typically includes a central processing unit (CPU), an input output (I/O) interface, and a memory, including an operating system and a web browser. In one embodiment, operating system maintains an invocations event order list that provides the site from which invocations events are received.

In one embodiment, the memory includes the security application, which comprises two main components: a) a detection engine that is configured to monitor invocations in the registry of the Operation System (OS) by listening to the set registry path of the OS, and b) a database preloaded with predefined parameters which represent the behavior of selected pieces of software codes of different malwares.

According to an embodiment of the present invention, the security application performs the following tasks: At first it detects whenever a software code performs an invocation activity (e.g., a system call). At the next step, it detects the site within the invoking code, from which the invocation has been launched. This is done in order to analyze one or more pieces of code (that may belong to an executable or to a DLL) in the surrounding area of that site and/or in branches related to that site that are responsible for launching the invocation. For example, the piece of code to be analyzed may be associated with portions of the functions call tree, such as a specific subroutine or a combination of specific code lines that are spaced from each other by several code instructions. This results in a subset of properties in the form of a unique pattern, which can then be associated with the existence of malware and even with the type of malware. At the next step it checks whether the properties of the analyzed pieces of codes (or at least part of them) matches the predefined software code parameters or patterns stored in the database. A match between the properties of the analyzed pieces of codes and the predefined software code indicates that the software is a malware or any other type of software code that is needed to be detected.

For example, known behavior of several types of malwares such as SpyEye is to first add an entry in HKCU\Software\Microsoft\Windows\CurrentVersion\Run Windows Registry key in order to load itself at the startup sequence of Windows (when the user logs in).

Typically when the OS receives an invocation, it transfers the system request through various layers. As described, should a malware code tries to permanently install itself by adding a value to a Registry Key of the Windows Registry, the security application monitors this attempt and detects the site from which said invocations has been launched and pieces of code in the surrounding area of this site.

In one embodiment, the security application compares each analyzed piece of software code against a "black" list of known malware patterns. When one or more pieces of codes matches an entry in the "black" list, the associated software code that tries to install itself is terminated or blocked; otherwise, the software code is allowed to complete the installation.

Figure 2:
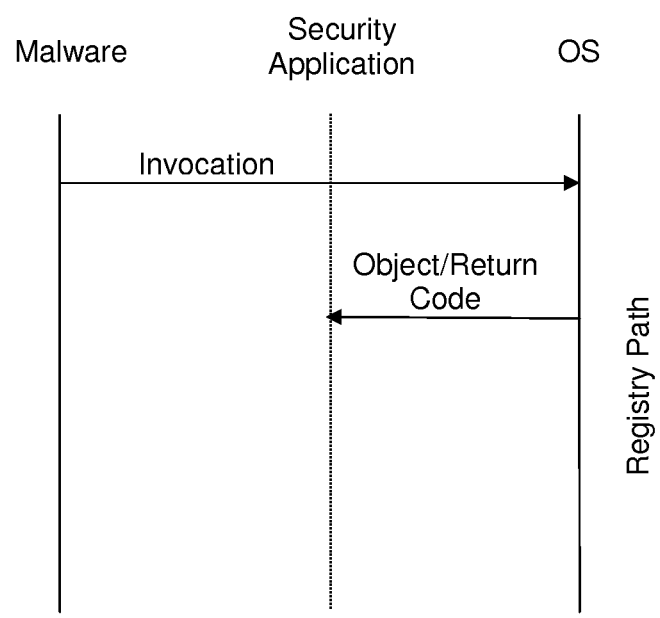
FIG. 2 is a flow chart generally illustrating an embodiment of the invention.

Referring now to FIG. 2, illustrates a diagram representation of the notification order list in the registry path of the OS at the first stages of a malware installation attempt in accordance with an embodiment of the invention.

As used herein, a computer memory refers to a volatile memory, a non-volatile memory, or a combination of the two. Although the security application is referred to as an application, this is illustrative only. The security application should be capable of being called from an application or the operating system. In one embodiment, an application is generally defined to be any executable code. Moreover, those of skill in the art will understand that when it is said that an application or an operation takes some action, the action is the result of executing one or more instructions by a processor.

As illustrated in FIG. 1, since the security application is notified on OS-level system calls, this medium or at least a portion thereof, resides on the computer system itself (client device) and the remaining portion may be stored in a memory that is physically located in a location different from the host computer. This could be accomplished in a client-server system, or alternatively via a connection to another computer via modems and analog lines, or digital interfaces and a digital carrier line.

In view of this disclosure, the functionalities of the security application in accordance with the embodiments of the present invention can be implemented in a wide variety of computer system configurations. In addition, the functionalities of the security application could be stored as different modules in memories of different devices. For example, security the application could initially be stored in computer system, and then as necessary, a portion of the security application could be transferred to the host computer system and executed on the host computer system.

Consequently, part of the functionality of the security application would be executed on the processor of server computer system, and another part would be executed on processor of the host computer system.

In view of this disclosure, those of skill in the art can implement various embodiments of the present invention in a wide-variety of physical hardware configurations using an operating system and computer programming language of interest to the user. In yet another embodiment, the security application is stored in a memory of a server computer system. The security application is transferred over a network to the memory in a host computer system.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for determining, by a security application, whether an examined process code on a host computer is a malware, comprising the steps of:
   a. detecting by said security application whenever said examined process code performs an invocation activity that is an attempt to
      i. cause said examined process code to persist on said host computer by trying to permanently install said examined process code on said host computer, or
      ii. cause said examined process code to be part of a startup sequence;
   b. detecting a call site, being a site of an instruction within said examined process code, from which said invocation activity has been launched;
   c. analyzing one or more pieces of code selected in specific relation to said site from a surrounding area of said site;
   d. comparing at least a part of the properties of the analyzed pieces of code with a predefined software code pattern associated with malware and determining whether said examined process code corresponds to said predefined software code pattern; and
   e. classifying said examined process code as malware where the results of the comparing indicate that said examined process code corresponds to said predefined software code pattern.

2. A method according to claim 1, wherein the examined process code is loaded from an executable or from a DLL.

3. A method according to claim 1, wherein the examined process code is a portion of the functions call tree, a specific subroutine or a combination of specific code lines that are spaced from each other by several code instructions.

4. A method according to claim 1, wherein the security application or at least a portion thereof, resides on the host computer.

5. A method according to claim 1, wherein detection of attempts to install a malware is made in real-time.

6. A method according to claim 5, wherein upon detection the malware is prevented from completing installation.

7. A method according to claim 1, wherein the invocati invocation attempt comprises a system call.

8. A method according to claim 1, wherein the security application is capable of being called from an application or from the operating system of the host computer.

9. A system for determining whether an examined process code on a host computer is a malware, the system comprising:
   a database storing at least one predefined software code pattern associated with malware; and
   a security application configured to
      detect whenever said examined process code performs an invocation activity that is an attempt to
         i. cause said examined process code to persist on said host computer by trying to permanently install said examined process code on said host computer, or
         ii. cause said examined process code to be part of a startup sequence,
      detect a call site, being a site of an instruction within said examined process code, from which said invocation activity has been launched,
      analyze one or more pieces of code selected in specific relation to said site from a surrounding area of said site,
      compare at least a part of the properties of the analyzed pieces of code with a predefined software code pattern associated with malware and determine whether said examined process code corresponds to said predefined software code pattern, and
      classify said examined process code as malware where the results of the comparing indicate that said examined process code corresponds to said predefined software code pattern,
   wherein the security application or at least a portion thereof, resides on the host computer.

10. A system according to claim 9, wherein the examined process code is loaded from an executable or from a DLL.

11. A system according to claim 9, wherein the examined process code is a portion of the functions call tree, a specific subroutine or a combination of specific code lines that are spaced from each other by several code instructions.

12. A system according to claim 9, wherein detection of attempts to install a malware is made in real-time.

13. A system according to claim 12, wherein upon detection the malware is prevented from completing installation.

14. A system according to claim 9, wherein the invocation attempt comprises a system call.

15. A system according to claim 9, wherein the security application is capable of being called from an application or from the operating system of the host computer.

* * * * *